(12) United States Patent
Jaladanki et al.

(10) Patent No.: US 8,098,688 B1
(45) Date of Patent: Jan. 17, 2012

(54) METHODS AND APPARATUS FOR OPTIMIZING NETWORK MANAGEMENT TRAFFIC USING DYNAMIC SNMP PACKET RESIZING

(75) Inventors: Malyadri Jaladanki, San Jose, CA (US); Yi Wang, Cupertino, CA (US); Gilbert Levesque, Palo Alto, CA (US)

(73) Assignee: Tellabs, San Jose, Inc., Naperville, IL (US)

(*) Notice: Subject to any disclaimer, the term of this patent is extended or adjusted under 35 U.S.C. 154(b) by 190 days.

(21) Appl. No.: 12/434,165

(22) Filed: May 1, 2009

(51) Int. Cl.
*H04J 3/00* (2006.01)
*G06F 15/173* (2006.01)

(52) U.S. Cl. .................... 370/473; 709/223
(58) Field of Classification Search .......... 370/470, 370/471, 472, 473, 474, 468, 476, 477, 230, 370/231, 232; 709/203, 208, 209, 219, 224, 709/225, 222, 229, 230, 231, 226
See application file for complete search history.

(56) References Cited

U.S. PATENT DOCUMENTS

| | | | |
|---|---|---|---|
| 7,012,913 B2 * | 3/2006 | Maturi | 370/349 |
| 7,304,959 B1 * | 12/2007 | Swaroop et al. | 370/252 |
| 7,451,227 B2 * | 11/2008 | Lee et al. | 709/232 |
| 7,471,681 B2 * | 12/2008 | Jason et al. | 370/392 |
| 7,505,484 B2 * | 3/2009 | Pancholi et al. | 370/470 |
| 7,792,031 B2 * | 9/2010 | Krishnan et al. | 370/230.1 |
| 2007/0263657 A1 * | 11/2007 | Sugar et al. | 370/465 |

* cited by examiner

*Primary Examiner* — Hanh Nguyen
(74) *Attorney, Agent, or Firm* — James M. Wu; JW Law Group (57) ABSTRACT

An apparatus and method for improving efficiency of data transfer utilizing packet resizing to optimize network management traffic are disclosed. After obtaining a maximum link capacity of a link which is capable of transmitting information, a process of dynamic packet resizing compares the maximum link capacity with a network management system ("NMS") maximum packet size. The outbound packet size of a network element ("NE") is set to the maximum link capacity if the maximum link capacity of the link is smaller than the NMS maximum packet size.

17 Claims, 7 Drawing Sheets

METHODS AND APPARATUS FOR OPTIMIZING NETWORK MANAGEMENT TRAFFIC USING DYNAMIC SNMP PACKET RESIZING

FIELD

The exemplary embodiment(s) of the present invention relates to network systems. More specifically, the exemplary embodiment(s) of the present invention relates to information transfer between network device and management system.

BACKGROUND

A high-speed network environment typically includes network devices such as routers and switches used for facilitating delivery of information packets and/or data traffic from source devices to destination devices via communication networks such as IP and/or packet-based networks. Information pertaining to the transfer of data packet(s) and/or frame(s) through the network(s) is usually embedded within the packet and/or frame itself. Each packet, for instance, traveling through multiple nodes via one or more communication networks such as Internet and/or Ethernet can typically be handled independently from other packets in a packet stream or traffic. Each node which may include routing, switching, and/or bridging engines processes incoming packet(s) or frame(s) and determines where the packet(s) or frame(s) should be forwarded.

A typical modern communications network usually includes various network devices such as network elements ("NEs") as well as Network Management systems ("NMSs"). An NE, for instance, is a managed logical entity including one or more physical devices. An NMS, on the other hand, is a managing logic entity capable of managing one or more NEs via a network management protocol, for example SNMP.

Today's NEs can be complex wherein each NE involves and processes larger volume of information such as massive configuration/statistics related data. For example, a conventional NE is able to transfer and process voluminous management information between NE(s) and NMS(s). A traditional approach for transferring management information between an NE and an NMS is to use predefined value for the maximum packet size that is exchanged between the entities. A problem associated with the traditional approach is that transferring management information using a predefined maximum packet size may not take advantage of the underlying link capacity to the fullest extent thereby resulting in a large number of request-response transactions. However, predefining a large value for packet size to use maximum link capacity may result in fragmentation if the link capacity goes down and can cause communication problems. High volume of request-response management transactions can slow down and/or clog network management traffic, and consequently, degrade overall network performance.

SUMMARY

An apparatus and method for improving network management communication utilizing dynamic packet resizing are disclosed. After obtaining a maximum link capacity of a link, a process of dynamic packet resizing for the network management traffic compares the maximum link capacity with the maximum packet size that can be handled and/or processed by a network management system ("NMS"). The outbound packet size of a network element ("NE") is set to the maximum link capacity if the maximum link capacity is smaller than the maximum packet size that can be handled by NMS.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Exemplary embodiment(s) of the present invention is described herein in the context of a method, device, and apparatus of optimizing network management traffic using dynamic packet resizing.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and description to refer to the same or like parts.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. It, however, will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method.

Unless otherwise defined, all terms (including technical and scientific terms) used herein have the same meaning as commonly understood by one of ordinary skills in the art to which the exemplary embodiment(s) belongs. It will be further understood that terms, such as those defined in commonly used dictionaries, should be interpreted as having a meaning that is consistent with their meaning in the context of the relevant art and this exemplary embodiment(s) of the disclosure unless otherwise defined.

As used herein, the singular forms of article "a", "an" and "the" are intended to include the plural forms as well, unless the context clearly indicates otherwise. Also, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items A network element ("NE"), in one embodiment, is capable of optimizing network management traffic using a process of dynamic packet resizing. Upon detecting and registering a Network Management System ("NMS"), the process identifies the link capacity that is used to provide management transactions between the NE and NMS. After obtaining the maximum link capacity, the process compares the maximum link capacity with an NMS maximum packet size. The outbound packet size of the NE is subsequently set to the maximum link capacity if the maximum link capacity of the link is smaller than the NMS maximum packet size.

It should be noted that the term "data packet" can also be referred to as a "packet," "a packet stream," "data stream," "data," "data frames," "frames," and the like. In addition, the term "NMS maximum packet size" can also be referenced as "maximum packet size of NMS," "maximum packet size of a network manager," "maximum packet size of a manager," "maximum packet size of a management system," "maximum packet size of a network management system," and the like.

Figure 1:
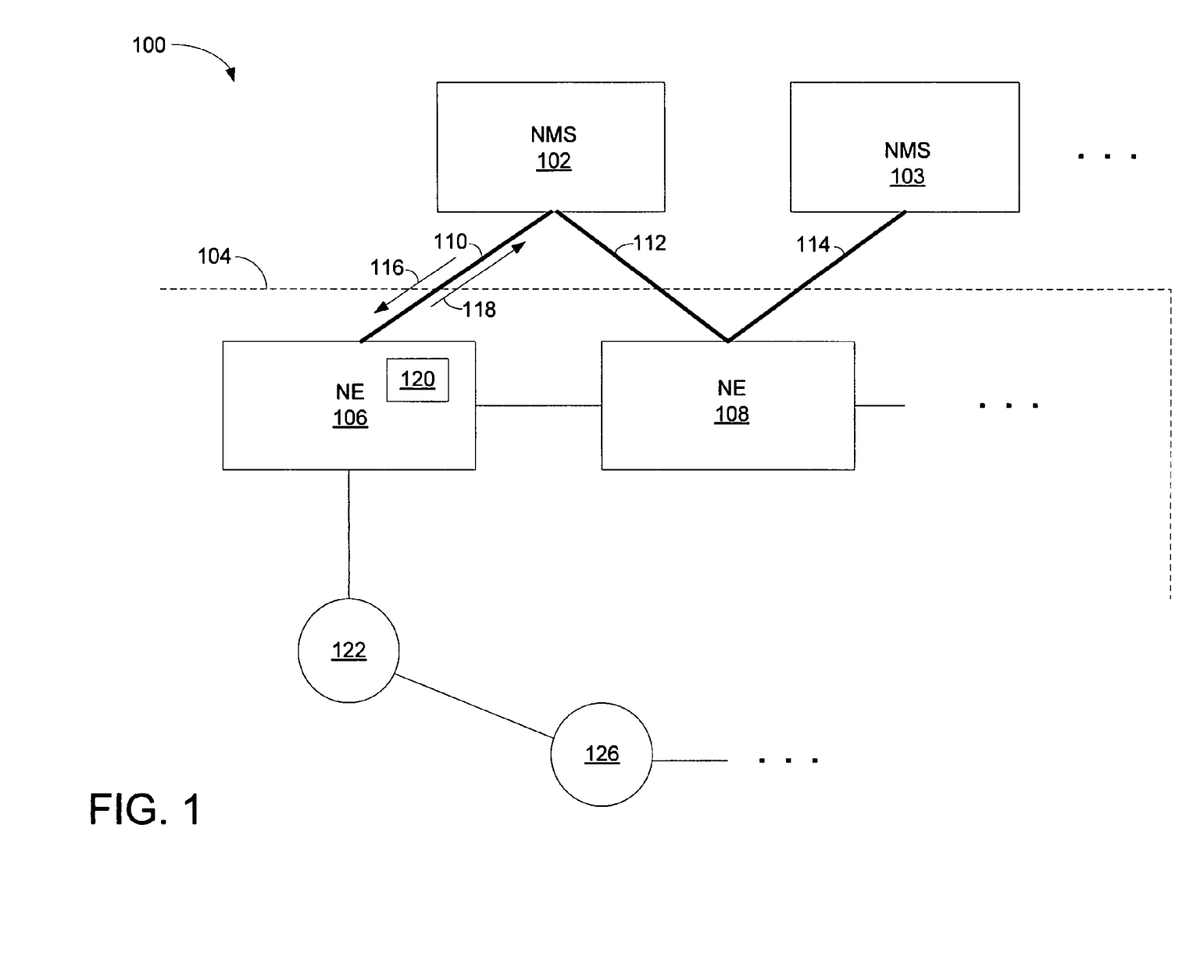
FIG. 1 is a block diagram illustrating a network configuration having network management systems ("NMSs") and network elements ("NEs") in accordance with one embodiment of the present invention.

FIG. 1 is a block diagram 100 illustrating a network configuration having NMSs and NEs in accordance with one embodiment of the present invention. Diagram 100 includes NMSs 102-103 and a network environment 104 wherein network environment 104 further includes NEs 106-108, and nodes 122-126. A node, which can be one or more NEs, is an active electronic entity capable of sending, receiving, or forwarding information over a communications channel or a link. Links or connections 110-114 are employed to couple NMSs 102-103 with NEs 106-108. It should be noted that the underlying concept of the exemplary embodiment(s) of the present invention would not change if one or more blocks (or elements or links) were added to or removed from diagram 100.

NEs 106-108, also known as managed devices, are hardware devices which may include routers, connections, switches, bridges, computers, terminal servers, and/or a combination of routers, connections, switches, bridges, computers, and/or terminal servers connected in network environment 104. While each NE may be connected to its neighboring NE(s), the NE is generally connected to at least one NMS. For example, NE 108 is coupled to both NMSs 102-103 via links 112-114 and may be managed by one or both NMSs. The NE can also be considered as a facility or equipment used to facilitate provisioning of telecommunications services. In one example, an NE further includes an agent 120 which can be a software module(s) responsible for network management transactions.

NMS 102 is a computer, workstation, a server, and/or a cluster of computers capable of executing various network management applications. Various NEs and nodes are constantly being managed and monitored by a NMS(s) in a managed network environment. In each managed environment, at least one NMS should be present. Depending on the applications, multiple NMSs may be used to manage and/or monitor one or more NEs in a network. A network can either be a circuit-based network or a packet-based network.

NMSs 102-103 are coupled with NEs 106-108 via links 110-114 wherein links 110-114 can be wires, cables, coax connections, wireless connections, and the like. For example, NMS 102 may issue a message 116 using a management protocol. NE 106, subsequently, sends a response 118 to reply to message 116. The network protocol can be the Simple Network Management Protocol ("SNMP"). It should be noted that depending on the applications, a different type of network protocol may be used in place of SNMP.

SNMP is a network managing and surveillance protocol used in network management systems for monitoring NEs and/or network devices attached to the network environment. For example, SNMP includes an application layer protocol which is able to process management data to control various managed systems or NEs. NMS employs SNMP to manage a number of attached NEs and/or managed systems. Each attached NE or managed system is configured to report status and/or information to and from at least one managing system or NMS.

For a circuit switching network, a link or a channel can be established between multiple nodes and/or terminals to facilitate network communication. It should be noted that a link or a circuit or a channel acts as an electrical circuit physically connecting two nodes, two NEs, or two network devices. For example, during a network discovery process, every NE as well as network circuit needs to be discovered and/or initialized by NMS or NMSs before each NE can access the network. Network discovery process can take time and resources for each NMS to complete a network configuration and/or a network discovery process. In another example, a network element discovery may be required when a primary router switches over to a backup router or vice verse.

To improve and/or optimize the efficiency of data transfer between NMS 102 and NE 106, NE 106 includes an agent 120 capable of facilitating dynamic packet resizing based on link capacity, NMS maximum packets size processing capacity, as well as maximum protocol packet size. To improve efficiency of management information transfer, agent 120, for example, is able to intelligently resize SNMP packets destined to NMS 102 in accordance with the capacity of link 110. If, for example, the link capacity is higher than the original outbound packet size but lower than NMS maximum capacity, the outbound packet size is resized to the link capacity. Resizing the outbound packet can increase the outbound packet capacity thereby reducing the overall number of responses or messages between NE and NMS. It should be noted that the reduction of number of response messages will reduce network management traffic thereby enabling a process of faster data discovery.

An advantage of using dynamic packet resizing for network management protocol such as SNMP is to optimize network management traffic. The embodiment of dynamic packet resizing is applicable to network devices using SNMP as well as other similar network management protocols.

Figure 2:
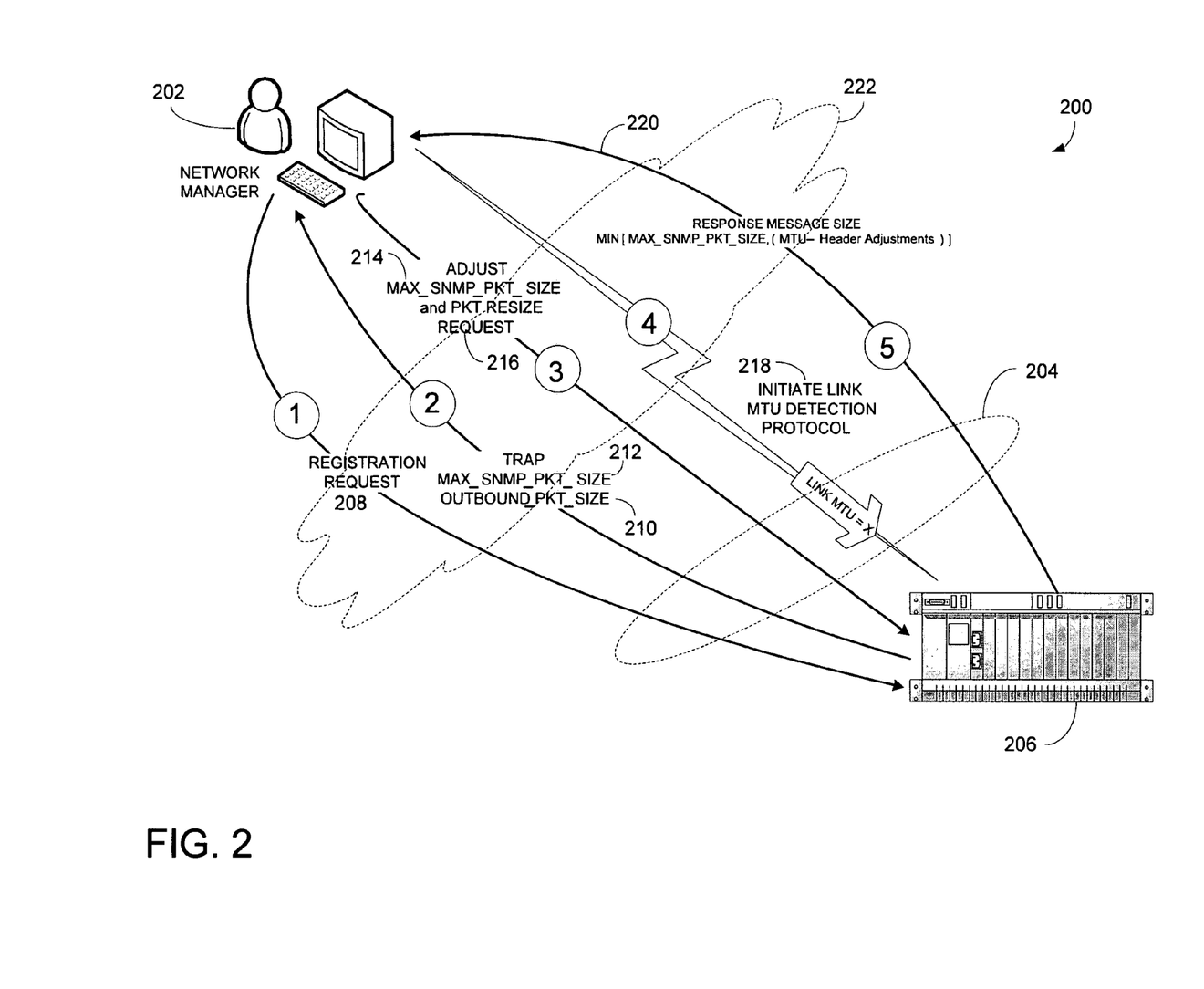
FIG. 2 is a block diagram illustrating a network configuration having NMS and NE capable of supporting dynamic packet resizing technique in Simple Network Management Protocol ("SNMP") environment in accordance with one embodiment of the present invention.

FIG. 2 is a block diagram 200 illustrating a network configuration having NMS and NE capable of supporting dynamic SNMP packet resizing technique in accordance with one embodiment of the present invention. Diagram 200 includes NMS 202, a link 204, and NE 206 wherein link 204 provides network management communications or transactions between NMS 202 and NE 206 via a communications network 222. It should be noted that the underlying concept of the exemplary embodiment(s) of the present invention would not change if one or more blocks (or elements or channels) were added to or removed from diagram 200.

The network configuration shown in FIG. 2 illustrates a logic implementation of a management communication between a manager and NE using a process of dynamic packet resizing. To establish an optimized connection, a network manager issues a message 1 including a registration request 208 from NMS 202 to NE 206 via link 204. After receipt of registration request 208, NE 206 responds with a trap message 2 containing a maximum SNMP packet size ("MAX_S-NMP_PKT_SIZE") 212 and an outbound packet size ("OUTBOUND_PKT_SIZE") 210. In one example, MAX_SNMP_PKT_SIZE 212 and OUTBOUND_PKT_SIZE 210 have default values 8192 and 1500, respectively. Note that OUTBOUND_PKT_SIZE 210 with the initial value or default value such as 1500 is referred to as the original OUTBOUND_PKT_SIZE.

When NMS 202 elects to activate the option of dynamic packet resizing, NMS 202 forwards a message 3 indicating a packet resize request 216 to NE 206 via link 204. In the event that NMS 202 is able to handle a larger packet size than the original OUTBOUND_PKT_SIZE 210 but smaller than MAX_SNMP_PKT_SIZE, NMS 202 adjusts and/or resets MAX_SNMP_PKT_SIZE to the NMS maximum packet size ("NMS_MAX_PKT_SIZE"). The MAX_SNMP_PKT_SIZE with the new value is subsequently sent to NE 206 via message 3. It should be noted that the adjusted MAX_SNMP_PKT_SIZE can be sent via an independent or other message(s).

After arrival of message 3, NE 206 initiates a link maximum transmission unit ("MTU") discovery 218 via an MTU detection protocol 4 to determine an MTU value. The MTU value, in one embodiment, indicates the link capacity of link 204. The link capacity indicates the maximum information that a data packet can carry across a link without IP fragmentation. Upon identification of MTU value or link capacity, OUTBOUND_PKT_SIZE 210 is set to the MTU value if the MTU value is greater than the original outbound packet size but smaller than NMS_MAX_PKT_SIZE. When NE 206 responds a message 5 to NMS 202 upon a request, the OUTBOUND_PKT_SIZE with the new value (or MTU value) size is used. In one embodiment, the MTU value is the MTU minus header adjustments, and the outbound packet size is set to a smaller value of MAX_SNMP_PKT_SIZE or the MTU value.

In an application, if a link coupled between an NE and NMS has a higher capacity or data rate, the NE can build a mechanism as described above to take advantage of higher link capacity to transfer more information per each transaction. As such, the bigger or larger packet size can reduce overall network management traffic. It should be noted that the link capacity may change dynamically and IP packet fragmentation may occur if network element uses a predefined static value of SNMP outbound packet size. Accordingly, the mechanism of dynamic packet resizing can reduce or eliminate IP packet fragmentation at the same time using the communication link to fullest capacity.

Agents or SNMP agents, for example, support smaller packet sizes of 484 bits and MTU of most communication networks is 1500 bits. The maximum SNMP/user datagram protocol ("UDP")/IP protocol data unit ("PDU") size, for example, is 65518 with IP fragmentation. Since an agent and/or manager may accept and/or create a maximum PDU size, SNMP is able to map a SNMP PDU to a single UDP/IP datagram. If IP packet is larger than an MTU along the path, IP fragmentation will occur. As such, the process of dynamic packet resizing needs to identify a value of outbound SNMP packet size that is within processing limits of agent and manager while taking advantage of maximum link capacity without IP fragmentation.

An advantage of using dynamic packet resizing is better performance in network management transactions by reducing overall network management traffic. A faster discovery of network element data, for example, can be achieved using the process of dynamic packet resizing.

Figure 3:
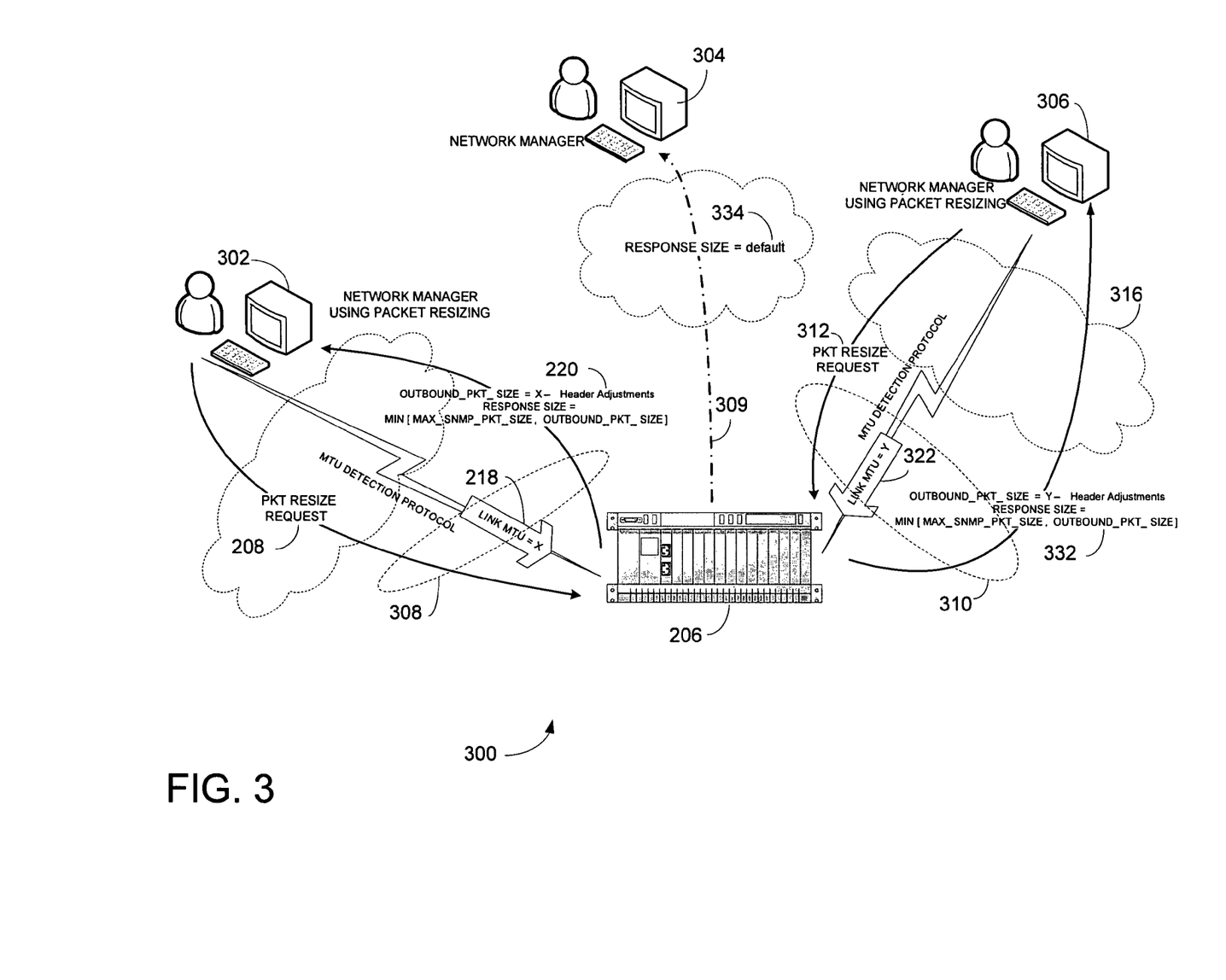
FIG. 3 is a block diagram illustrating a network configuration having multiple NMSs and NE capable of implementing dynamic packet resizing in accordance with one embodiment of the present invention.

FIG. 3 is a block diagram 300 illustrating a network configuration having multiple NMSs and an NE capable of implementing dynamic packet resizing in accordance with one embodiment of the present invention. Diagram 300 includes NMSs 302-306, an NE 206, and links 308-310. Note that NMS 302 and link 308 are similar to and capable of performing similar functions as NMS 202 and link 204 as described in diagram 200. It should be noted that the underlying concept of the exemplary embodiment(s) of the present invention would not change if one or more blocks (or elements or connections) were added to or removed from diagram 300.

The network configuration illustrated in FIG. 3 demonstrates NE 206 coupled to three (3) NMSs 302-306 via three links 308-310 wherein each link is capable of operating at a unique link capacity. NE 206, in one embodiment, includes an agent wherein the agent further includes multiple worker threads (or sub-agents or control modules) wherein each worker thread is designated to handle communication on a link. Alternatively, NE 206 can include three agents wherein each agent is designated to communicate on a link. For example, link 309, which is used to couple NE 206 with NMS 304, is set to operate at a default value 334, in which the original outbound packet size is used. Alternatively, NMS 306 has activated the option or process of dynamic packet resizing for link 309. While link 308, for instance, operates at a capacity of X MTU value 218, link 310 is set to operate at a capacity of Y MTU value 322. X MTU value 218, Y MTU value 322, and default value 334, for example, are different values. Alternatively, X MTU value 218, Y MTU value 322, and default value 334 can be set to the same value.

To leverage larger link capacities, one or more link packet size detection processes may be initiated. Packet size on each link is detected and reinitialized as soon as an associated NMS is registered and identified. Note that NMSs and links can be dynamically connected as well as disconnected to the network for a given period of time. It should be further noted that since link 308 as indicated earlier is similar to link 204 described in FIG. 2, the process of establishing of link 308 is not reiterated.

When NMS 306 enters a network 316, the administrator or manager issues a registration request from NMS 306 to NE 206 via link 310. After receipt of registration request, NE 206 responds with a message having information relating to the maximum SNMP packet size and the original (or default) outbound packet size to NMS 306. When NMS 306 subsequently activates packet resizing option or request 312, NE 206 initiates a link MTU discovery which is used to determine Y MTU value 322. Y MTU value 322 indicates the maximum capacity of link 310. In one embodiment, an MTU value is the MTU minus various header adjustments such as IP header and TCP header. Upon identifying Y MTU value 322, the agent of NE 206 compares and selects a smaller value between Y MTU value 322 and the maximum packet size of NMS 306 for the new outbound packet size 332 provided that the maximum packet size of NMS 306 is smaller than the maximum SNMP packet size. Note that link 309 operates at a default link capacity since NMS 304, for instance, has not issued a request for packet resizing yet.

Figure 4:
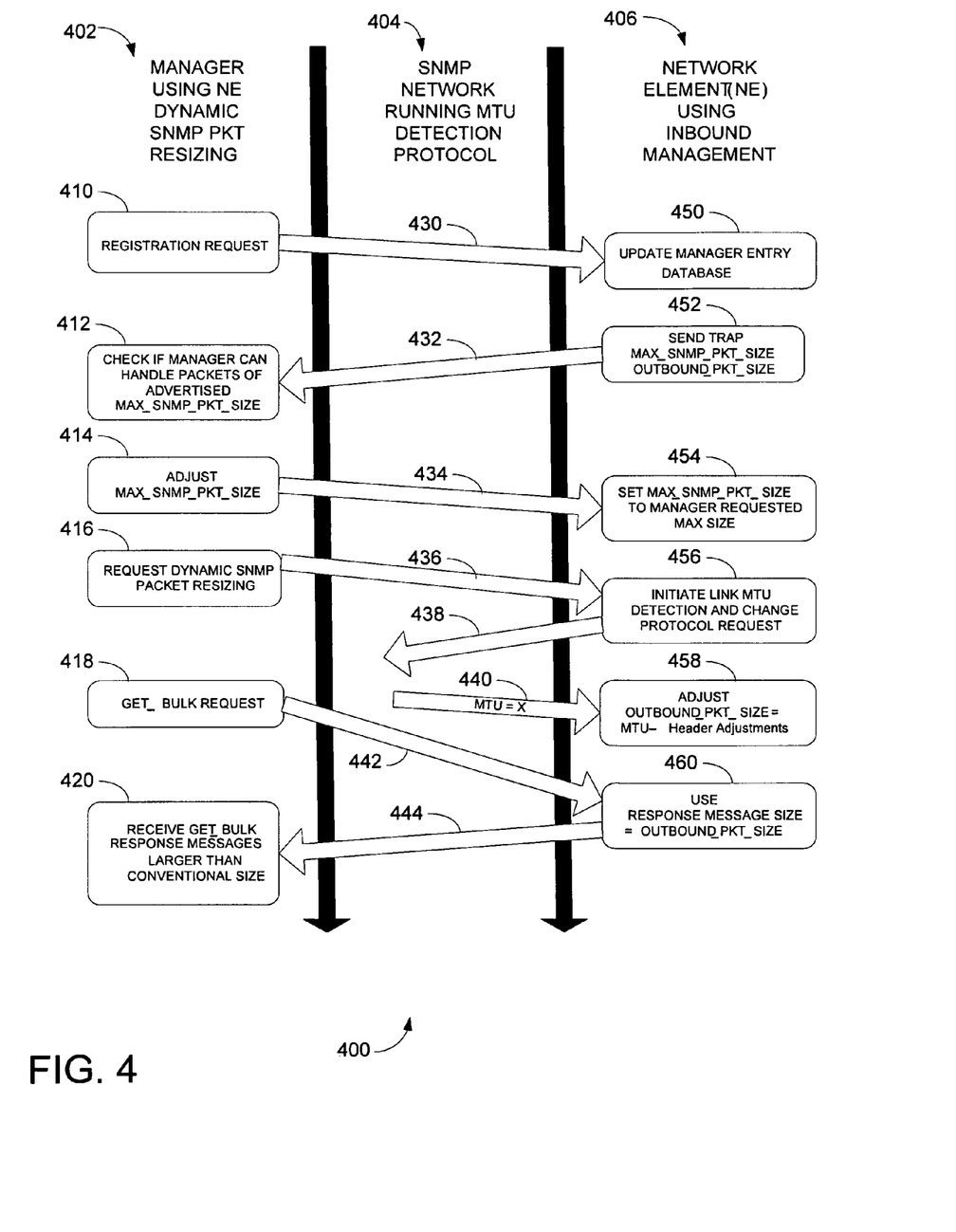
FIG. 4 is a logic diagram illustrating an exemplary process of dynamic packet resizing in a SNMP environment in accordance with one embodiment of the present invention.

FIG. 4 is a logic diagram 400 illustrating an exemplary process of dynamic packet resizing in a SNMP environment in accordance with one embodiment of the present invention. Diagram 400 includes a manager column 402, a SNMP network column 404, and a NE column 406. In one embodiment, column 402 is a NMS capable of using NE dynamic SNMP packet resizing mechanism while column 406 illustrates a NE capable of using inbound management. The NMS and NE are coupled by a SNMP link wherein the link capacity can be discovered by running an MTU detection protocol. It should be noted that the underlying concept of the exemplary embodiment(s) of the present invention would not change if one or more blocks (or columns) were added to or removed from diagram 400.

When a network manager enters the network, a registration request 410 is issued from NMS 402 to NE 406 via a SNMP message 430. After updating manager entry database 450 in accordance with message 430, the NE sends a trap message 432 which includes information relating to the SNMP maximum packet size and default outbound packet size to the network manager at column 402. The network manager subsequently checks its capability to see if it can handle the advertised maximum SNMP packet size or a specified maximum SNMP packet size. If the network manager discovers that it cannot handle the maximum SNMP packet size, the network manager sends a message 434 requesting an adjustment to the maximum SNMP packet size 414 in view of the maximum packet size that the manager can provide or handle. After receipt of message 434, the NE resets maximum SNMP packet size to manager requested or adjusted maximum packet size 454.

If the network manager elects to activate the process of dynamic packet resizing for the management information transactions, a request of dynamic SNMP packet resizing 416 is sent to NE 406 via a message 436. Upon arrival of message 436, the NE initiates the link MTU detection protocol request 456 via a command 438 to the underlying network using the Link Detection Protocol module in NE. The Link Detection Protocol module in the NE subsequently returns a message 440 with an MTU value of the underlying network link. After arrival of message 440, the NE adjusts outbound packet size to MTU minus header adjustments if the MTU value is smaller than the maximum SNMP packet size while it is greater than the default value of the outbound packet size.

When the NE receives a message 442 of get bulk request 418 from the network manager, the NE composes a response message 444 using a packet size that equals to the outbound packet size. Response message 444 travels from NE 406 to NMS 402 via SNMP network 404. When the network manager receives response message 444, it should be able to handle message 444 although message 444 is larger than conventional or default packet size as indicated by numeral 420. It should be noted that since SNMP network is capable of handling a resized packet with the MTU value, the occurrence of IP fragmentation is minimized.

Figure 5:
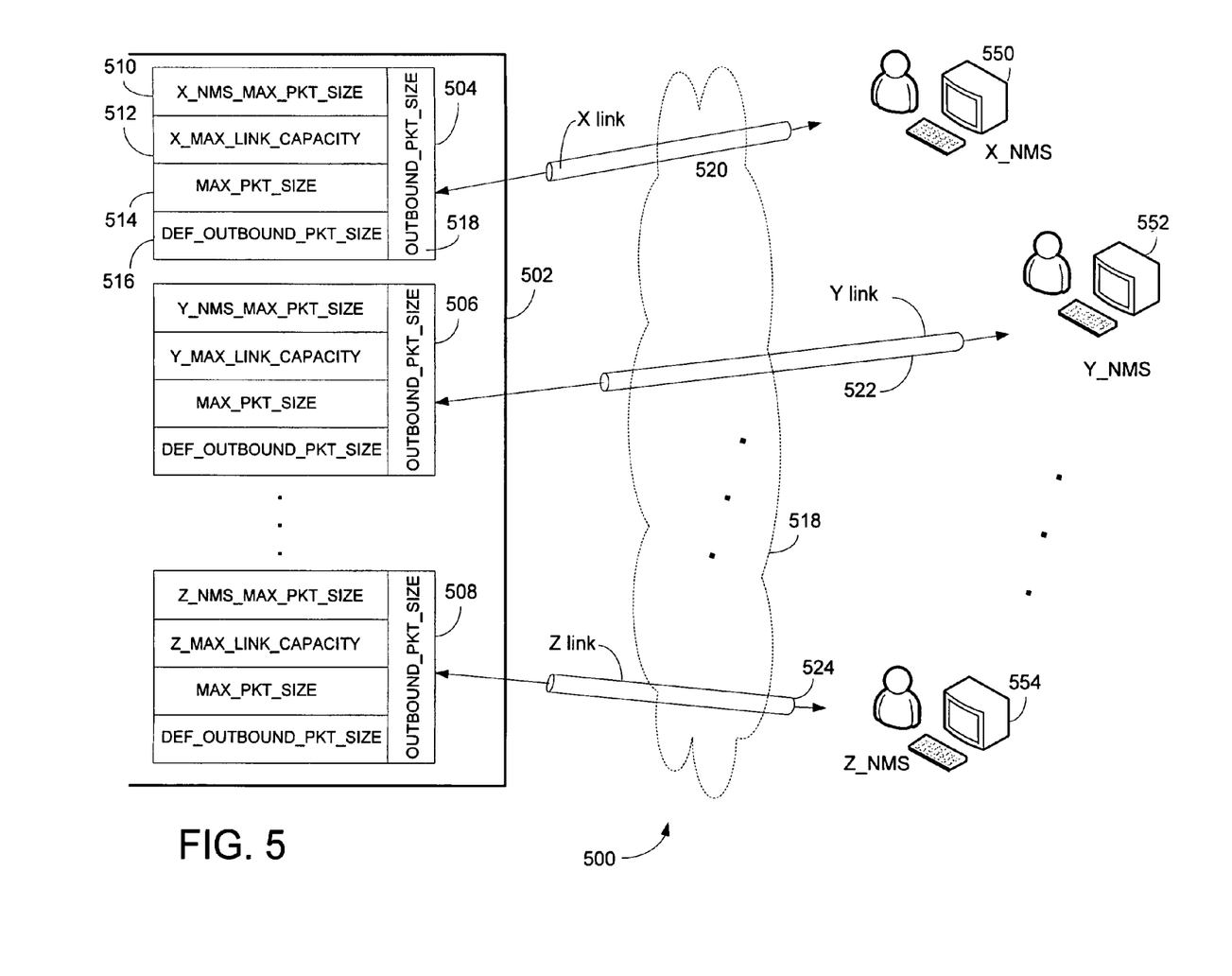
FIG. 5 is a block diagram illustrating an agent having multiple worker threads in accordance with one embodiment of the present invention.

FIG. 5 is a block diagram 500 illustrating an agent 502 having multiple worker threads 504-508 in accordance with one embodiment of the present invention. Diagram 500 includes multiple work threads or sub-agents 504-508, NMSs 550-554, and links 520-524. Agent 502, which may be resided within an NE, is responsible for communicating with NMS(s). It should be noted that the underlying concept of the exemplary embodiment(s) of the present invention would not change if one or more blocks (or elements or links) were added to or removed from diagram 500.

Agent 502, in one embodiment, includes multiple worker threads 504-508 wherein the total number of work threads can dynamically change depending on the number of NMS attached to network 518. Depending on the applications, agent 502 can manage multiple independent management information transactions between multiple NMSs using one or more link capacities via one or more links 520-524. For example, the outbound packet size for X link may be different from the outbound packet size for Y link. Similarly, the outbound packet sizes for X link and Y link are different from the outbound packet size for Z link. The link capacity can change in real-time and agent 502 can adjust the capacity accordingly. Alternatively, the outbound packet sizes for X link, Y link, and Z link can be set to the same size.

Each worker thread such as worker thread 504 includes an NMS maximum packet size entry 510, a maximum link capacity entry 512, a maximum packet size entry 514, a default outbound packet size entry 516, and an outbound packet size entry 518. Entry 514 stores the maximum packet size wherein the size of the packet, in one example, depends on the management protocol. For instance, if the management protocol is SNMP, maximum packet size is the maximum SNMP maximum packet size. Note that entries 514-516 may be the same for all worker threads. Outbound packet size 518 is retrieved from one of entries 510-516. In one embodiment, the process of dynamic packet resizing obtains an outbound packet size by selecting a smaller value of the MTU value or the maximum manager packet value wherein the maximum manager packet size is smaller than the maximum SNMP packet size.

The exemplary aspect of the present invention includes various processing steps, which will be described below. The steps of the aspect may be embodied in machine or computer executable instructions. The instructions can be used to cause a general purpose or special purpose system, which is programmed with the instructions, to perform the steps of the exemplary aspect of the present invention. Alternatively, the steps of the exemplary aspect of the present invention may be performed by specific hardware components that contain hard-wired logic for performing the steps, or by any combination of programmed computer components and custom hardware components.

Figure 6:
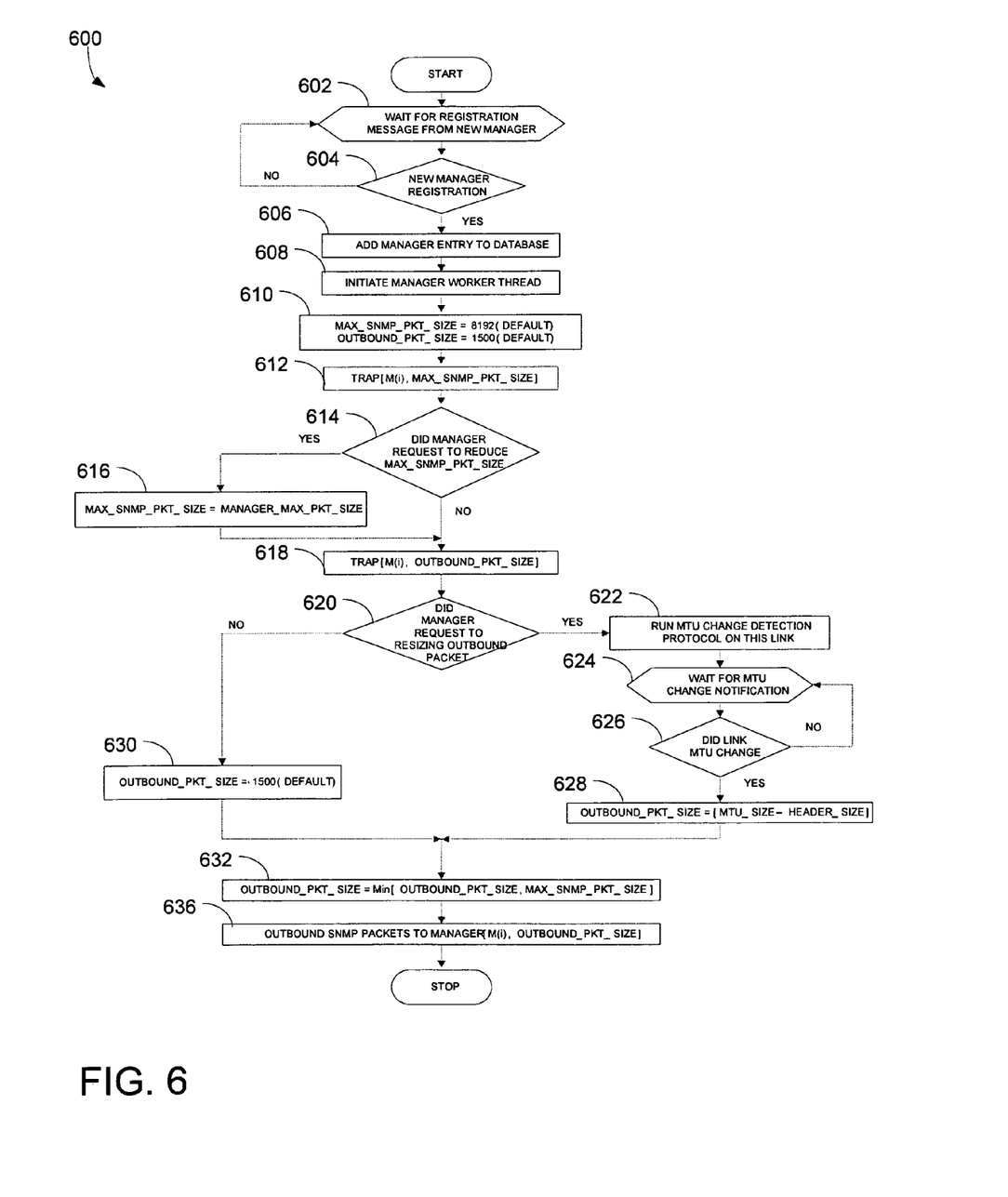
FIG. 6 is a flowchart illustrating an exemplary packet resizing process in a SNMP environment in accordance with one embodiment of the present invention.

FIG. 6 is a flowchart 600 illustrating an exemplary packet resizing process in a SNMP environment in accordance with one embodiment of the present invention. At block 602, the process in NE waits for registration message from a new manager or NMS. When the NE receives an incoming registration request, the process examines whether the incoming registration request is from a new manager. If the registration is for a new manager, the process proceeds to block 606. Otherwise, the process loops back to block 602 waiting for an incoming registration request from a new manager.

After adding the new manager to a manager entry in a database at block 606, the process initiates a manager worker thread at block 608 for handling communication to the new manager. The agent ascertains that it does not transmit packets greater than the size that the manager can accept. Note that the manager specifies the packet limit during the registration request. The agent registers the manager and creates a manager specific worker thread that handles communication with the manager.

At block 610, the NE sends a message (trap) to NMS containing default values including the maximum SNMP packet size and outbound packet size. For example, the default value for the maximum SNMP packet size is 8192 while the default value for the outbound packet size is 1500. At block 612, the manager specific worker thread sends out a trap to inform the MAX_SNMP_PKT_SIZE to manager. It should be noted that the maximum SNMP packet size is the maximum packet capacity that can be received/transmitted by NE without any internal fragmentation.

If the manager is not capable of handling such large packets, the manager at block 614 can modify the value of this variable. At block 616, the NE subsequently uses the new updated value as its upper bound while communicating with the manager. At block 618, the manager specific worker thread sends out a trap to inform OUTBOUND_PKT_SIZE to the manager. Note that this is the size used to form outgoing SNMP packets destined to the manager. If the manager can handle varying packet sizes smaller than the advertised size (maximum SNMP packet size), the manager can ask the agent to resize outgoing SNMP packets destined to the Manager. The process proceeds to block 620.

Upon receiving a request of packet resizing from the manager, the agent initiates a link MTU discovery and change notification protocol at block 622. Note that several protocols can be used for MTU discovery and change notifications on a link. While the process waits for MTU change notification at block 624, the process at block 626 checks to see whether link MTU changes. If the link MTU (minus applicable headers) suggests a higher value than the current value of OUTBOUND_PKT_SIZE, this variable is updated to a new MTU value at block 628. New outbound packet size is capable of sending out bigger response packets to the manager. Note that all adjustments made to the outbound packet size can not exceed the original MAX_SNMP_PKT_SIZE. If the manager does not select the packet resizing option at block 620, the outbound packet size is set to a default value at block 630.

At block 632, the outbound packet size is set to a smaller value of the MTU value or the maximum SNMP packet size. At block 636, the agent is capable of using larger OUTBOUND_PKT_SIZE to forward management information to the manager. As such, more management information can be sent between NE and NMS thereby reducing the overall network management traffic.

Figure 7:
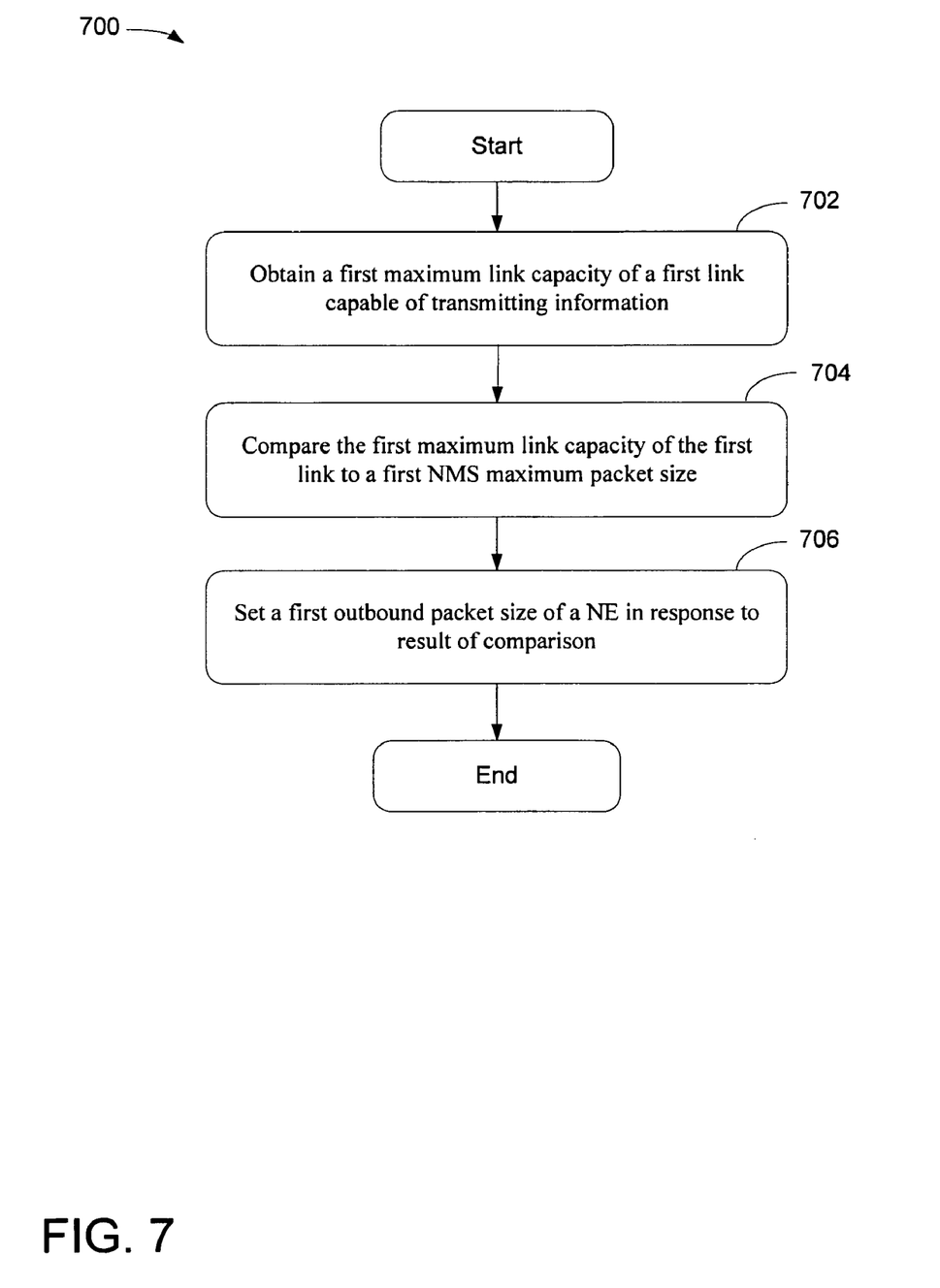
FIG. 7 is a flowchart illustrating an exemplary process of packet resizing for a network management communication in accordance with one embodiment of the present invention.

FIG. 7 is a flowchart 700 illustrating an exemplary process of packet resizing for a network management communication in accordance with one embodiment of the present invention. At block 702, a process of dynamic packet resizing obtains a first maximum link capacity of a first link which is capable of transmitting management information. Upon detecting a first manager registration issued by the first NMS over the first link, the process, for example, updates a database located in the NE in accordance with the first NMS associated to the first manager registration. In one embodiment, a first network message indicating the first maximum packet size and the first outbound packet size is sent from the NE to the first NMS via the first link. After arrival of the first network message, a first response indicating the first NMS maximum packet size is issued by the first NMS to the NE via the first link. After acknowledging a first request of dynamic SNMP packet resizing, a first link MTU is initiated to identify the first link capacity. The first maximum link capacity of a first link is obtained by subtracting header adjustments from a MTU value.

At block 704, the process compares the first maximum link capacity of the first link with a first NMS maximum packet size. In one example, the first maximum link capacity of the first link with the first NMS maximum packet size is obtained by identifying a smaller value between the first maximum link capacity of the first link and the first NMS maximum packet size.

At block 706, a first outbound packet size of a NE is set in response to a result of comparison between the first maximum link capacity of the first link and the first NMS maximum packet size. The first maximum packet size is resized to the first NMS maximum packet size if the original first maximum packet size is greater than the first NMS maximum packet size. Alternatively, the first outbound packet size is set to the first maximum link capacity if the first maximum link capacity is smaller than the first NMS maximum packet size.

In one embodiment, upon detecting a second manager registration issued by a second NMS over a second link, the database located in the NE is updated in accordance with the second NMS associated to the second manager registration. After sending a second network message indicating the second maximum packet size and the second outbound packet size from the NE to the second NMS via the second link, a second response is sent to indicate the second NMS maximum packet size from the second NMS to the NE via the second link. Upon sending a second request of dynamic SNMP packet resizing from the second NMS to the NE, a process of second link MTU to identify a second link capacity is initiated. The second maximum link capacity of the second link and a second NMS maximum packet size are then compared. A second outbound packet size is resized in accordance with the result of comparison between the second maximum link capacity and the second NMS maximum packet size.

While particular embodiments of the present invention have been shown and described, it will be obvious to those of skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method for transferring packets between network management systems and network elements via one or more network links, comprising:
   obtaining a first maximum link capacity of a first link operable to transmit information, wherein obtaining a first maximum link capacity of a first link includes subtracting header adjustments from a maximum transmission unit ("MTU") value;
   comparing the first maximum link capacity of the first link with a first network management system ("NMS") maximum packet size, wherein comparing the first maximum link capacity of the first link with the first NMS maximum packet size includes identifying maximum packet size that the first NMS is able to handle; and
   setting a first outbound packet size of a network element ("NE") in response to a result of comparison between the first maximum link capacity of the first link and the first NMS maximum packet size.

2. The method of claim 1, further comprising:
   detecting a first manager registration issued by the first NMS over the first link; and updating a database located in the NE in accordance with the first NMS associated to the first manager registration.

3. The method of claim 2, further comprising:
sending a first network message indicating a first maximum packet size and the first outbound packet size from the NE to the first NMS via the first link; and
issuing a first response indicating the first NMS maximum packet size from the first NMS to the NE via the first link.

4. The method of claim 3, further comprising:
sending a first request of dynamic SNMP packet resizing from the first NMS to an agent of the NE; and
initiating a process of first link maximum transmission unit ("MTU") to identify the first link capacity.

5. The method of claim 4, further comprising:
sending a second request of dynamic SNMP packet resizing from a second NMS to the NE; and
initiating a process of second link MTU to identify a second link capacity.

6. The method of claim 5, comprising:
obtaining a second maximum link capacity of a second link operable to transmit information;
comparing the second maximum link capacity of the second link with a second NMS maximum packet size; and
setting a second outbound packet size of the NE in response to a result of comparison between the second maximum link capacity of the second link and the second NMS maximum packet size.

7. The method of claim 1, further comprising:
detecting a second manager registration issued by a second NMS over a second link;
updating the database located in the NE in accordance with the second NMS associated to the second manager registration;
sending a second network message indicating a second maximum packet size and a second outbound packet size from the NE to the second NMS via the second link; and
issuing a second response indicating the second NMS maximum packet size from the second NMS to the NE via the second link.

8. The method of claim 1, wherein comparing the first maximum link capacity of the first link with the first NMS maximum packet size includes identifying a smaller value between the first maximum link capacity of the first link and the first NMS maximum packet size.

9. The method of claim 8, wherein setting a first outbound packet size at an NE includes:
resizing a first maximum packet size to the first NMS maximum packet size if the first maximum packet size is greater than the first NMS maximum packet size; and
resizing the first outbound packet size to the first maximum link capacity if the first maximum link capacity is smaller than the first NMS maximum packet size.

10. A method for transferring packets between network management systems and network elements via one or more network links, comprising:
initiating a first link maximum transmission unit ("MTU") discovery for determining a first MTU value indicating a first link capacity;
setting a first outbound packet size to a first MTU value for communication between an agent and a first network management system ("NMS") when the first MTU value is greater than the first outbound packet size;
initiating a second link maximum transmission unit ("MTU") discovery for identifying a second MTU value indicating a second link capacity;

setting a second outbound packet size to the second MTU value for communication between the agent and a second NMS when the second MTU value is greater than the second outbound packet size;
setting the first outbound packet size of the NE to a first NMS maximum packet size if the first NMS maximum packet size is greater than the first outbound packet size; and
sending a first request of dynamic SNMP packet resizing from the first NMS to an agent of the NE.

11. The method of claim 10, further comprising:
detecting a first manager registration issued by the first NMS over the first link; and
updating a database located in the NE in accordance with the first NMS associated to the first manager registration.

12. The method of claim 11, further comprising:
sending a first network message indicating a first maximum packet size and the first outbound packet size from the NE to the first NMS via the first link; and
issuing a first response indicating the first NMS maximum packet size from the first NMS to the NE via the first link.

13. A method of claim 11, wherein initiating a first link MTU discovery includes determining the first MTU value indicating the first link capacity by subtracting a header from a first MTU size.

14. A method of claim 13, wherein setting a first outbound packet size to a first MTU value includes setting a first Simple Network Management Protocol ("SNMP") outbound packet size to the first MTU value if the first MTU value is smaller than the first NMS maximum packet size.

15. A network system, comprising:
a first network management system ("NMS") capable of monitoring one or more managed devices;
a first link coupled to the first NMS and capable of transferring data up to a first maximum link capacity; and
a network element ("NE") coupled to the first link and configured to include an agent wherein the agent is capable of communicating to the first NMS via the first link with the first maximum link capacity;
wherein the agent includes a first worker thread capable of initiating a first link maximum transmission unit ("MTU") discovery for determining a first MTU value indicating a first link capacity and setting a first outbound packet size to a first MTU value for communication between the agent and the first NMS when the first MTU value is greater than the first outbound packet size;
wherein the agent further includes a second worker thread capable of initiating a second link MTU discovery for identifying a second MTU value indicating a second link capacity and setting a second outbound packet size to the second MTU value for communication between the agent and a second NMS when the second MTU value is greater than the second outbound packet size.

16. The network system of claim 15, further comprising:
a second NMS coupled with the NE; and
a second link coupled to the second NMS and capable of transferring data up to a second maximum link capacity, wherein the agent is capable of communicating to the second NMS via the second link with the second maximum link capacity.

17. The network system of claim 16, wherein the first maximum link capacity is different from the second maximum link capacity.

* * * * *

UNITED STATES PATENT AND TRADEMARK OFFICE
CERTIFICATE OF CORRECTION

PATENT NO. : 8,098,688 B1
APPLICATION NO. : 12/434165
DATED : January 17, 2012
INVENTOR(S) : Malyadri Jaladanki, Yi Wang and Gilbert Levesque It is certified that error appears in the above-identified patent and that said Letters Patent is hereby corrected as shown below:

In CLAIM 13 column 12, line 23, replace "11" with "10".

Signed and Sealed this
Twenty-eighth Day of February, 2012

David J. Kappos
*Director of the United States Patent and Trademark Office*